United States Patent [19]

Makeham et al.

[11] 3,958,911

[45] May 25, 1976

[54] DIE CUTTER FOR FORAGE CUBING DEVICE

[76] Inventors: Patricia L. Makeham, Crazy Horse Ranchos Lot No. 2, Weatherford, Tex. 76086; Donnie M. Smith, 6 Martin, P.O. Box 5626 - Riac; Joseph D. Beaty, 1201 W. McGaffey No. 25, both of Roswell, N. Mex. 88201

[22] Filed: Apr. 12, 1974

[21] Appl. No.: 460,487

[52] U.S. Cl. .................... 425/289; 425/308; 425/DIG. 230; 37/141 T; 37/142 R; 83/698; 83/831

[51] Int. Cl.² .................... B26D 7/00; B29C 17/14

[58] Field of Search .................... 425/DIG. 230, 308, 289, 425/293, 310, 373; 37/141 T, 142 R; 83/698, 694, 831; 56/1

[56] References Cited

UNITED STATES PATENTS

| | | | |
|---|---|---|---|
| 2,603,985 | 7/1952 | Vidmar | 37/142 R |
| 3,063,176 | 11/1962 | Larson | 37/142 R |
| 3,251,316 | 5/1966 | Forth | 425/DIG. 230 |
| 3,323,445 | 6/1967 | Bushmeyer et al. | 100/86 |
| 3,425,362 | 2/1969 | Lundell | 425/DIG. 230 |
| 3,621,594 | 11/1971 | Hahn et al. | 37/141 T |
| 3,738,402 | 6/1973 | Cross | 83/698 X |

OTHER PUBLICATIONS

Foundry Management and Technology, p. 29, Sept. 1975.

Construction Methods and Equipment, Aug. 1975.

*Primary Examiner*—Robert L. Spicer, Jr.
*Attorney, Agent, or Firm*—Clarence A. O'Brien; Harvey B. Jacobson

[57] ABSTRACT

A die cutter for a hay pelleter has a die replaceably mountable on a ring of the pelleter. A sleeve is removably mounted on the die for permitting replacement of the cutting edge of the die cutter without the necessity of dismounting the die from the ring and removing the die to a shop for resharpening. The cutting edge may be replaced by removing the old dull sleeve from the die and mounting on the die a new, sharp sleeve.

4 Claims, 6 Drawing Figures

DIE CUTTER FOR FORAGE CUBING DEVICE

BACKGROUND OF THE INVENTION

1. Field of the Invention

This invention relates generally to a die cutter, and particularly to a replaceable-edge die cutter for a hay pelleter.

2. Description fo the Prior Art

Alfalfa, and the like, is no longer being baled in the conventional manner which produces bales made of a plurality of leaves. Rather, it is picked from the field, run through a shredding device and then compacted into an elongated tube. For example, the shredded material may be compacted by forcing the material through a square channel approximately 2 by 2 inches. The elongated tube of compacted alfalfa is then cut into, for example, 2-inch cubes by the same processing machine as by means of a slicing device conventionally manufactured from chrome steel, and the like.

As the known pelletizing machines are conventionally constructed, when the cutting device, or die becomes dull, it is necessary to remove the die, take it to a machine shop where the die is resharpened and hardened. This is an extremely time-consuming operation, and causes substantial down time of the pelletizing of the machine.

Examples of conventional hay pelleter machines can be found in U.S. Pat. Nos. 3,338,158 and 3,362,142, both issued to J. W. Crane et al, No. 3,323,445, issued to R. W. Bushmeyer et al, and No. 3,316,694, issued to H. F. McColly et al.

It is generally known to provide removable blades on scrapping and earth working devices. See, for example, U.S. Pat. No. 3,160,967, issued to I. H. Nichols.

SUMMARY OF THE INVENTION

It is an object of the present invention to provide for replacement of cutting dies on hay pelleter machines without the necessity of taking the cutting die to a shop for resharpening and hardening.

It is another object of the present invention to provide a die cutter having a removable insert permitting easy replacement of the cutting edge of the die.

It is still another object of the present invention to provide a die cutter for pelletizing machines which can be manufactured at substantially less cost than existing dies, and can be recycled after their replacement.

These and other objects are achieved according to the present invention by providing a die cutter having a die mountable on a ring of a hay pelleter, and a sleeve removably mounted on the die. The sleeve is preferably substantially V-shaped, with the V formed by a pair of converging walls which form a cutting edge at the juncture thereof. When this cutting edge becomes dull, the sleeve is simply removed from the die and replaced by a new sleeve having a sharp cutting edge.

These together with other objects adn advantages which will become subsequently apparent reside in the details of construction and operation as more fully hereinafter described and claimed, reference being has to the accompanying drawings forming a part hereof, wherein like numerals refer to like parts throughout.

DESCRIPTION OF THE PREFERRED EMBODIMENT

Figure 1:
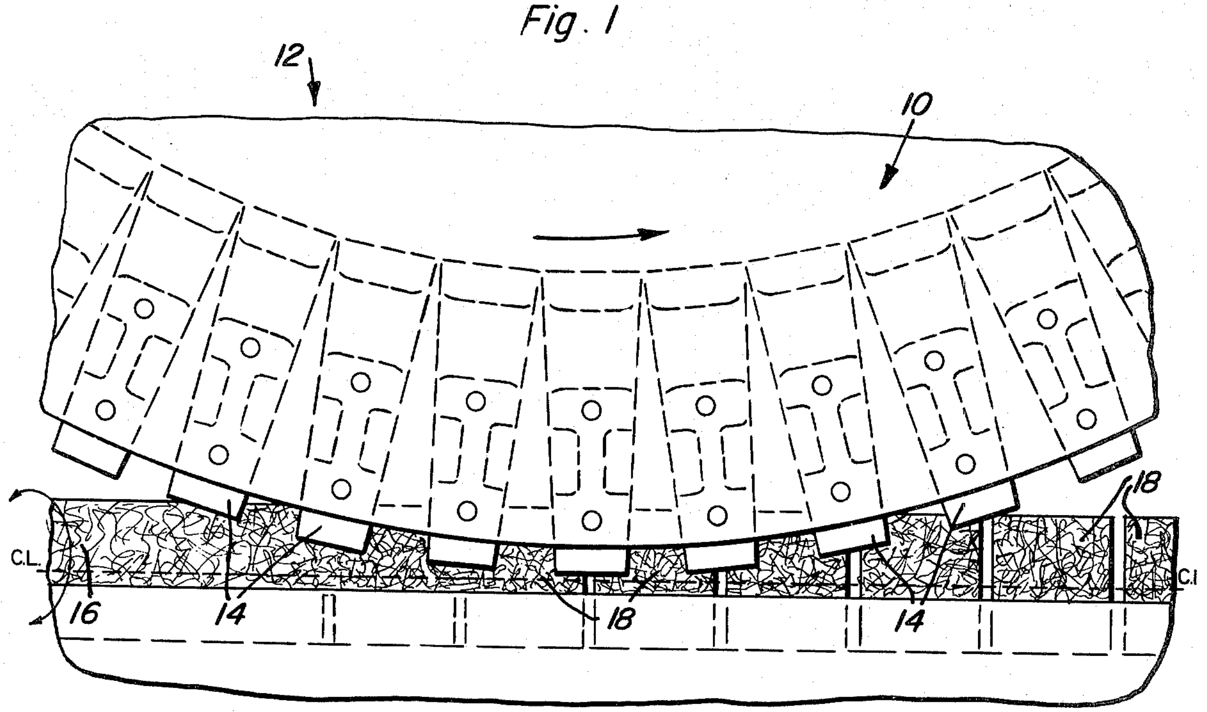
FIG. 1 is a fragmentary, schematic, side elevational view showing die cutters according to the present invention mounted on a conventional hay pelletizer cutting ring.
Figure 4:
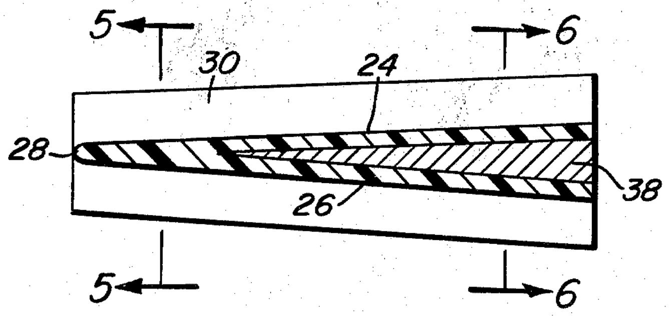
FIG. 4 is a sectional view taken generally along the line 4—4 of FIG. 3.
Figure 5:
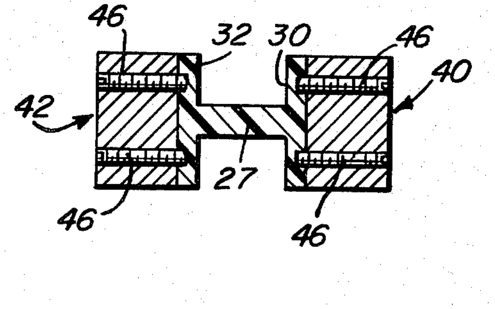
FIG. 5 is a sectional view taken generally along the line 5—5 of FIG. 4.
Figure 6:
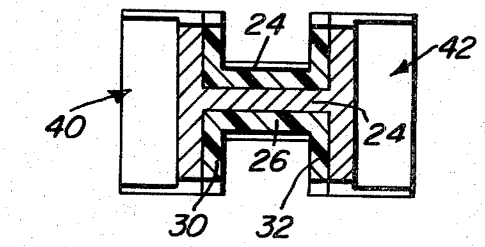
FIG. 6 is a sectional view taken generally along the line 6—6 of FIG. 4.

Referring now more particularly to FIG. 1 of the drawings, a ring 10 of a conventional pelleter 12 (such as shown in Bushmeyer et al, U.S. Pat. No. 3,323,445) is provided with a plurality of die cutters 14 according to the present invention. A ring 10 may carry, for example, sixty-six dies. The ring causes the dies to engage with a rotating tube 16 of alfalfa, supported by driven rollers (not shown), which has been compacted in a conventional manner (not shown) and to cut tube 16 into a plurality of pellets 18 which make up pelletized livestock feed. Referring now to FIGS. 2–6 of the drawings, each die cutter 14 includes a die 20 replaceably mountable on ring 10 in a conventional manner and a sleeve 22 removably mounted on die 20.

Sleeve 22 is substantially V-Shaped, and includes a pair of substantially planar walls 24 and 26 arranged converging toward one another to form the V. Walls 24 and 26 merge to form a jointed portion 27 terminating in a cutting edge 28. Sleeve 22 further includes a pair of spaced, substantially parallel plates 30 and 32 arranged abutting and affixed to the walls 24 and 26, respectively, in perpendicular, embracing relationship with respect to the walls. Each plate 30, 32 is provided with a V-shaped notch 34 arranged for matching with the V formed by walls 24, 26. A plurality of recesses 36 are advantageously provided on the outer or outwardly directed surfaces of plates 30, 32 for a purpose to be described below.

While it is to be understood that sleeve 22 may be fabricated from any suitable, known materials, a suitable thermoplastic resin such as a polycarbonate or a high impact polystyrene is preferred. As can be readily appreciated, sleeve 22 can be molded in any suitable, conventional manner from such resins.

Figure 2:
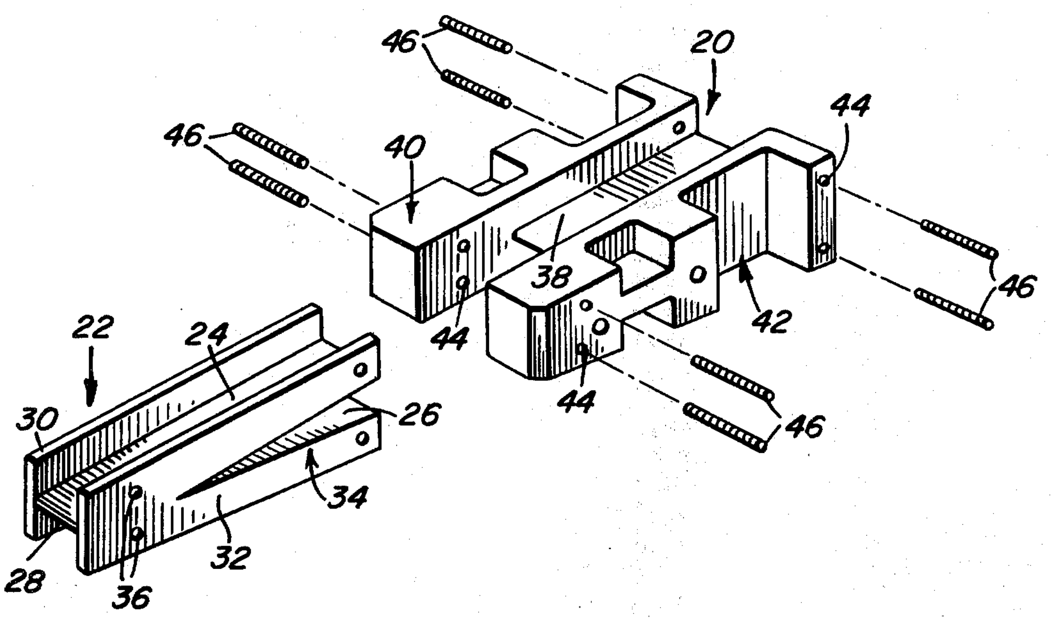
FIG. 2 is an exploded prospective view showing a die cutter according to the present invention.
Figure 3:
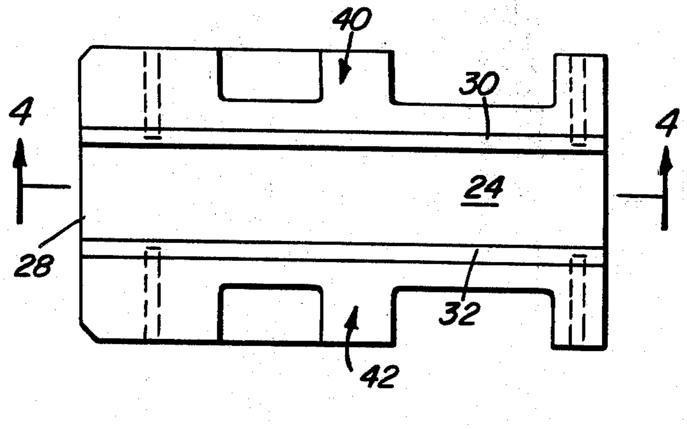
FIG. 3 is a top plan view showing the die cutter of FIG. 2.

Die 20 includes a substantially wedge-shaped portion 38 embraced by a pair of members 40 and 42. Portion 38 is arranged for receiving the planar walls 24 and 26 and plate notches 34 of sleeve 22, as can best be seen from FIGS. 2, 4, and 6 of the drawings. Members 40 and 42 are provided with projections, recesses, and holes arranged for permitting die 20 to be mounted on a conventional ring 10. These features of members 40 and 42 are best seen in FIGS. 2 and 3 of the drawings. Since these features are of a substantially conventional nature, they will not be described in greater detail herein.

Members 40 and 42 are also provided with a plurality of apertures 44 disposed so as to mate with recesses 36 provided in plates 30, 32 of sleeve 22 for securing a sleeve 22 to an associated die 20. The securing is achieved as by, for example, conventional veneer screws 46 arranged passing through apertures 44 and extending into recess 36. The apertures 44 are advantageously provided with internal screw threads, while apertures 44 may or may not be provided with such threads.

As can be readily appreciated from the above description and from the drawings, a cube die and sleeve arrangement, according to the present invention, will aid the farmer in the deletion of long down time, for replacement of worn die cutting edges which can easily be done in the field.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

We claim:

1. A die cutter for a hay pelleter, comprising, in combination: means for mounting a removable cutting sleeve on a replaceably mounted die so that an old dull sleeve may be removed from the die and replaced by a new, sharp sleeve without replacement of the die easily by a farmer in the field including; a die mountable on a ring of a hay pelleter; a sleeve provided with merging walls terminating in a cutting edge and removably mounted on the die, the die including a substantially wedge-shaped portion and a pair of members arranged embracing the wedge-shaped portion, the wedge-shaped portion being arranged forming a seat for receiving the sleeve, the sleeve is substantially V-shaped and the merging walls are a pair of planar walls arranged converging toward one another to form the V, the converging walls forming the cutting edge at the juncture thereof, and the sleeve further includes a pair of spaced, parallel plates arranged abutting the planar walls in perpendicular, embracing relationship with respect to the walls, each of the plates being provided with a V-shaped notch arranged for matching with the V formed by the planar walls.

2. A structure as defined in claim 1, wherein the wedge-shaped portion is arranged for receiving the planar walls and plate notches of the sleeve.

3. In combination with a cutting ring of a hay pelleter, a die cutter, comprising, in combination: means for mounting a removable cutting sleeve on a replaceably mounted die so that an old dull sleeve may be removed from the die and replaced by a new, sharp sleeve without replacement of the die easily by a farmer in the field including; a die mountable on a ring of a hay pelleter; and a sleeve provided with merging walls terminating in a cutting edge and removably mounted on the die, the die including a substantially wedge-shaped portion and a pair of members arranged embracing the wedge-shaped portion, the wedge-shaped portion being arranged forming a seat for receiving the sleeve, the sleeve is substantially V-shaped and the merging walls are a pair of planar walls arranged converging toward one another to form the V, the converging walls forming the cutting edge at the juncture thereof, and the sleeve further includes a pair of spaced, parallel plates arranged abutting the planar walls in perpendicular, embracing relationship with respect to the walls, each of the plates being provided with a V-shaped notch arranged for matching with the V formed by the planar walls.

4. A structure as defined in claim 3, wherein the wedge-shaped portion is arranged for receiving the planar walls and plate notches of the sleeves.

* * * * *